United States Patent
Fiebelkorn et al.

[11] 4,046,453
[45] Sept. 6, 1977

[54] PLUG CONNECTION FOR OPTICAL FIBERS

[75] Inventors: Klaus Dieter Fiebelkorn, Niederlauterbach, France; Günther Spitzer, Oberweier, Germany

[73] Assignee: Siemens Aktiengesellschaft, Munich, Germany

[21] Appl. No.: 483,515

[22] Filed: June 27, 1974

[30] Foreign Application Priority Data

July 5, 1973 Germany .............................. 2334286

[51] Int. Cl.² .............................................. G02B 5/14
[52] U.S. Cl. .................................................. 350/96 C
[58] Field of Search ...................................... 350/96 C

[56] References Cited
U.S. PATENT DOCUMENTS 3,734,594 5/1973 Trambarulo ........................ 350/96 C

*Primary Examiner*—John K. Corbin
*Attorney, Agent, or Firm*—Kenyon & Kenyon, Reilly, Carr & Chapin

[57] ABSTRACT

A plug connection for coupling the individual fibers of two optical fiber bundles or cables in which the cable ends are each provided with a connector having a guide member in which the fibers are supported in a longitudinally movable manner with fiber ends protruding therefrom with a coupling member adapted to mate with the connector having passages aligned with the longitudinal passages of the guide member for insertion of the respective fibers therein and wherein the distance which said fiber ends protrude from said connector guide member is greater that the length allotted to them in the coupling member whereby the fibers will abut against each other solidly and deform elastically into a space provided in each connector for that purpose.

4 Claims, 2 Drawing Figures

PLUG CONNECTION FOR OPTICAL FIBERS

BACKGROUND OF THE INVENTION

This invention relates to plug connections for optical fibers in general, and more particularly to an improved plug connection for such fibers.

In German application No. P 22,33,916.8 a connector plug for optical glass fibers is disclosed, which plug consists essentially of a capillary tube in which the glass fiber ends to be connected are brought into mutual contact and which is filled with an immersion liquid for better coupling of the glass fiber ends.

Although this arrangement is adequate, it suffers from a number of disadvantages. Its construction requiring an immersion liquid makes it somewhat complex and still the best possible coupling between fibers is not achieved. Thus, it can be seen that there is a need for an improved arrangement for coupling optical fibers which avoids the need for an immersion liquid and provide improved optical coupling. Such an arrangement must of course, provide for a proper centering of the fibers to be coupled.

SUMMARY OF THE INVENTION

The present invention provides such an arrangement. Each of the two fiber bundles or cables to be coupled is mounted in a connector in which the individual fibers are supported in a guide member in a longitudinally movable manner. These connectors on the ends of the optical fiber bundles are adapted to be coupled to a connecting tube containing therein a coupling member having passages aligned with those of the guide members of the connectors. The protruding fiber ends, i.e., the portions of the fibers protruding from the guide member of the connectors are made longer than the length provided therefor in the passages or capillary tubes in the coupling member. Between the guide member in the connector and a collet which clamps the optical fiber bundle to the connector, a space is provided to accommodate the elastic deformation of the fibers which occur in the coupling process when the extra long fiber ends abut and are pushed back.

Also, in accordance with the present invention, it is advisable to surface-grind the end faces of the fiber ends so as to obtain better coupling. Preferably, the length of the capillary tubes in the coupling member should be at least ten times the fiber diameter for best results.

DETAILED DESCRIPTION OF THE PREFERRED EMBODIMENT

Figure 1:
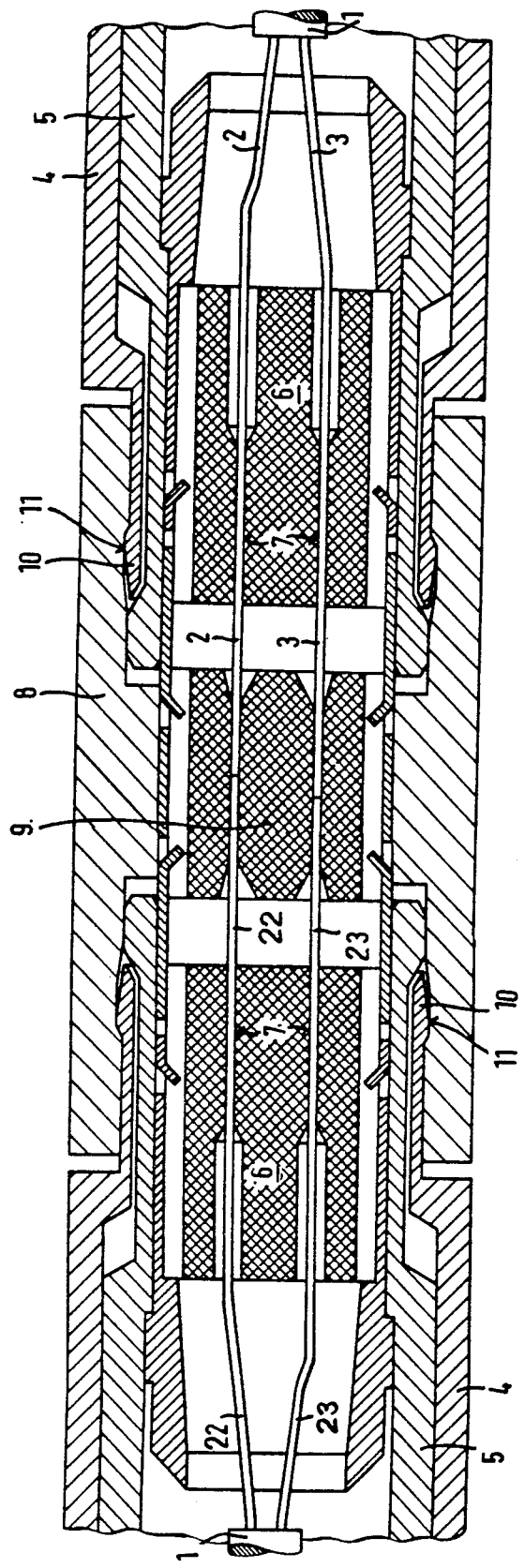
FIG. 1 is a longitudinal cross section through a plug connection according to the present invention.

As will become evident from the description of FIG. 2 below, the connector of the present invention is capable of coupling a fairly large plurality of optical fibers. The fibers 2 and 3 are to be coupled to corresponding fibers 22 and 23. It will be recognized that the fibers 22 and 23 are retained in an identical connector to that disclosed in connection to the fibers 2 and 3. As illustrated, the two fibers 2 and 3 are taken from the end of a fiber bundle or fiber cable designated as 1. The end of the optical fiber cable 1 is secured to a connector housing comprising a connector sleeve 4 and an inner tube 5 using a clamping collet not shown on the figure. Within the inner tube 5 of the connector there is installed a guide member 6 containing a plurality of holes 7. As illustrated, the holes 7 have a larger diameter on the right-hand side than on the left hand side. The diameter of the hole 7 on the left-hand side is just large enough to permit longitudinally movable support of the optical fibers 2 and 3. As illustrated on FIG. 1, the inner tube 5 and connector sleeve 4 are inserted into a connecting tube 8 which contains a coupling member 9. Spring fingers 10 at the circumference of the connector sleeve 4 snap into recesses 11 provided in the connecting tube 8. The length of the optical fibers 2 and 3 protruding from the ends of the longitudinal holes 7 prior to insertion of the connector into the connecting tube 8 is such as to be greater than the space provided for them in the connecting member 9. That is, their projection would be of the length shown in connection with the fiber 3 rather than the projection apparent with fiber 2. When the other connector having the fibers 22 and 23 similarly projecting is also inserted within the connecting tube there is insufficient room for the fibers causing them to press against one another and causing at least some of the fibers to be moved backwards sliding within the longitudinal holes 7 and deforming elastically within a space provided for that purpose between the fiber cable 1 and the guide member 6. This is illustrated in connection with the fiber 2 which as shown has been bent by its being pushed backward by the fiber 22. As a result, the end faces of the fibers are pressed together resiliently. Preferably, to make better optical contact, the end faces of the fiber ends are subjected to surface grinding. Furthermore, the length of the tubes within the coupling member 9 should be at least ten times the fiber diameter.

Figure 2:
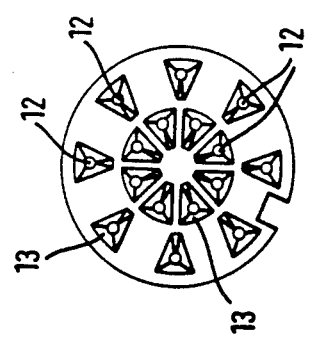
FIG. 2 is an end view of the coupling member of a connector such as that of FIG. 1.

FIG. 2 shows the end face of a coupling member such as the coupling member 9 of FIG. 1. The illustrated coupling member can accept a total of sixteen optical fibers in the sixteen holes 12 provided for that purpose. The holes are arranged on two concentric circles and each hole 12 has an end 13 which is either pyramid-shaped or conical shaped in an enlarged fashion to permit easier centering of the optical fibers when the connector is plugged into the connecting tube. This shaping of the ends 13 is also illustrated on FIG. 1.

Thus, an improved plug connection for coupling optical fibers has been shown. Although specific embodiments have been illustrated and described, it will be obvious to those skilled in the art that various modifications may be made without departing from the spirit of the invention which is intended to be limited solely by the appended claims.

What is claimed is:

1. A plug connection for cables made of optical fibers, the connector being of the type having capillary tubes for accepting the ends of the optical fibers to be coupled together comprising:
   a. first and second connectors each including a guide member having a plurality of longitudinal holes therein, a cable containing fibers to be connected being attached to said connector with the individual fibers inserted through said holes and supported therein in a longitudinally movable manner, with a space provided between the point of connection of said cable to said connector and said guide member;
   b. a coupling member having a plurality of longitudinal holes matching the longitudinal holes in said guide member;

c. means for coupling said first and second connectors and said coupling member; and d. fiber ends protruding from each of said connectors a distance which is greater than the length assigned to them within said coupling member.

2. A plug connection according to claim 1 wherein the end faces of said fiber ends are surface ground.

3. A plug connection according to claim 1 wherein the length of the capillary tubes in said coupling member is at least 10 times the fiber diameter.

4. A plug connection according to claim 3 wherein the end faces of said fiber ends are surface ground.